`United States Patent` [19]

Russo

[11] 4,361,506

[45] Nov. 30, 1982

[54] COMPOSITIONS COMPRISING A POLY(METHYL ETHENYL BENZENE) RESIN AND MINERAL OIL

[75] Inventor: Robert V. Russo, Brooklyn, N.Y.

[73] Assignee: Mobil Oil Corporation, New York, N.Y.

[21] Appl. No.: 119,681

[22] Filed: Feb. 8, 1980

[51] Int. Cl.³ .......................... C08F 2/04; C08K 5/01
[52] U.S. Cl. ................................. 524/577; 526/347; 526/347.1
[58] Field of Search ............... 260/33.6 A, 33.6 AQ, 260/33.6 UA, 33.6 PQ; 526/347.1, 347

[56] References Cited

U.S. PATENT DOCUMENTS

| | | | |
|---|---|---|---|
| 3,000,868 | 9/1961 | Powers | 526/237 |
| 3,417,041 | 12/1968 | Brown et al. | 260/33.6 UA |
| 3,595,776 | 7/1971 | Davidson et al. | 260/33.6 UA |
| 3,640,981 | 2/1972 | Davis | 525/2 |
| 3,803,079 | 4/1974 | Hokama | 260/33.6 UA |
| 3,816,315 | 6/1974 | Morduchowitz et al. | 526/312 |
| 3,865,776 | 2/1975 | Gergen | 260/33.6 PQ |
| 3,897,378 | 7/1975 | Scohy et al. | 260/22 CB |
| 4,143,084 | 3/1979 | Kaeding et al. | 584/24 |

FOREIGN PATENT DOCUMENTS

| | | | |
|---|---|---|---|
| 1424977 | 2/1976 | United Kingdom | 524/561 |
| 1575449 | 9/1980 | United Kingdom | |

Primary Examiner—Herbert J. Lilling
Attorney, Agent, or Firm—C. A. Huggett; M. G. Gilman; E. J. Trojnar

[57] ABSTRACT

Blends of a preformed poly(methyl ethenyl benzene) polymer or copolymer derived from an isomers of methyl ethenyl benzenes in which 1-methyl-4-ethenyl benzene is the predominant isomers, and up to about 10 weight percent of mineral oil are disclosed.

7 Claims, No Drawings

COMPOSITIONS COMPRISING A POLY(METHYL ETHENYL BENZENE) RESIN AND MINERAL OIL

BRIEF SUMMARY OF THE INVENTION

This invention relates to blends of a preformed poly(methyl ethenyl benzene) polymer or copolymer derived from an isomers of methyl ethenyl benzenes in which 1-methyl-4-ethenyl benzene is the predominant isomer, and up to about 10 weight percent of mineral oil.

DETAILED DESCRIPTION OF THE INVENTION

It is known to blend mineral oil with polystyrene in order to improve certain properties such as melt index which are important in molding operations.

The following illustrate the state of art in this regard:

Netherlands patent application No. 68,14,545, filed Oct. 11, 1968, "Styrene Polymer Composition";

Japanese Pat. No. 73-01236 of Jan. 16, 1973, of Iriko et al, "Composition of Polystyrene For Injection Blow Molding";

"Properties of PSB Cellular Polystyrene Molded Products", V. G. Khara Khash et al (USSR) Plast. Massy, 1972, (a), 38–41;

French Pat. No. 2,070,026, Oct. 15, 1971, "Aromatic Oils For Use As Plasticizers", Andre Rauch;

German Offenlegungsschrift, No. 2,315,115, Oct. 10, 1974, Thoma et al, "Mixing of High Viscosity Substances".

Mineral oil, however, is not completely compatible with polystyrene unless it is actually blended with the styrene monomer prior to or during polymerization. When mineral oil is added subsequent to polymerization of the styrene separation often occurs and the addition does not result in increase of the melt index of the polymer. On the other hand, it is often disadvantageous to blend mineral oil and monomer prior to polymerization since this requires commitment to a particular ultimate composition along with storage and inventory of the composition well in advance of its use.

In accordance with this invention polymeric resin compositions having mineral oil incorporated therein are provided to impart improved flow characteristics. The compositions do not undergo separation or require that the mineral oil be added to the resin prior to or during polymerization. More specifically, minor amounts of mineral oil are incorporated by blending into poly(methyl ethenyl benzene) resin in order to provide a composition suitable for molding operations and having superior flow characteristics.

Suitable amounts of mineral oil in accordance with this invention are 1 to 10 percent by weight based on the total composition, and preferably 2 to 6 percent by weight.

Blending of the oil and resin in accordance with the invention is carried out after the resin has been polymerized, for example, during extrusion. Typically, for example, the pelletized or granular resin and the mineral oil can be physically tumbled together in a hopper so that the oil coats the surface of the resin particles. The oil-coated particles are then passed through a standard extruder having orifice temperature in the range of 350°–450° F. so that the resin is actually melted to facilitate blending with the oil. It will, of course, be appreciated that other blending techniques known in the art can be used so long as they result in the resin and mineral oil being effectively blended together.

The mineral oil used according to the present invention should have a Saybolt Viscosity at 100° F. of about 50 to 500 SUS as determined using ASTM Test Method D 445. Preferably the Saybolt Viscosity will be about 200 to 400 and most preferably 340–380 at 100° F.

The poly(methyl ethenyl benzene) resins which are an essential component of the present invention can be prepared from the mixture of methyl ethenyl benzene isomers alone, described below, or the resins can be random, block or graft copolymers derived from 50 weight percent or more of the defined methyl ethenyl benzene isomers and up to 50 weight percent other ethylenically unsaturated monomers.

The poly(methyl ethenyl benzene) resins useful in the present invention comprised entirely of polymerized methyl ethenyl benzene can be obtained by polymerizing a mixture of isomers in the following ratio:

| Isomer | Weight percent |
|---|---|
| 1-methyl-2-ethenyl benzene | less than 0.1, preferably less than 0.05. |
| 1-methyl-3-ethenyl benzene | less than 15, preferably less than 10. |
| 1-methyl-4-ethenyl benzene | 85–100 preferably at least 90. |

Generally, the proportion of the p-isomer (1-methyl-4-ethenyl benzene) will be at least 95 weight percent and the m-isomer (1-methyl-3-ethenyl benzene) will constitute less than 5 weight percent of the mixture. Particularly preferred mixtures contain 97 to 99 weight percent of the p-isomer and 1 to 3 weight percent of the m-isomer.

The mixture of the isomeric methyl ethenyl benzenes for the preparation of the poly(methyl ethenyl benzene) resins be obtained by the catalytic dehydrogenation of a mixture of the corresponding ethyl toluenes, which in turn can be obtained by the selective alkylation process disclosed in U.S. Pat. No. 4,143,084 of Warren W. Kaeding and Lewis B. Young, the disclosure of which is incorporated herein by reference.

In its application to the production of methyl ethenyl benzenes, the method disclosed in the Kaeding and Yound patent essentially involves the alkylation of toluene with ethylene in the presence of certain crystalline aluminosilicate zeolite catalyst. The catalyst has a silica to alumina ratio of at least 12 and a constraint index (defined in the patent) within the range of 1 to 12. The process produces an extremely high proportion of the 1-methyl-4-ethyl benzene isomer, with only a minor proportion of the 1-methyl-3-ethyl benzene isomer and negligible amounts of the 1-methyl-2-ethyl benzene isomer. The almost complete absence of the 1-methyl-2-ethyl isomer is highly advantageous because this isomer tends to produce undesired by-products during the dehydrogenation step (indanes and indenes which adversely affect the properties of the resultant polymers which cannot be easily separated from the methyl ethenyl benzenes).

The mixture of isomeric methyl ethyl benzenes can be subjected to distillation prior to dehydrogenation step in order to separate out various by-products and after the dehydrogenation has been completed, a further distillation can be carried out to separate the methyl ethenyl benzenes from their saturated precursors.

Since the proportion of the 1-methyl-4-ethenyl benzene in the mixture is so high, usually at least 95 by weight, the mixture can be regarded essentially as "the para monomer" and the polymer produced by the polymerization of this mixture in the absence of other monomers as "the homopolymer" in order to distinguish it from polymers produced by polymerizing the mixture with other, copolymerizable monomers. It should, however, be remembered that "the homopolymer" may, in fact, be a copolymer of the isomeric monomers.

In general, the polymerization conditions appropriate to styrene will also be useful with the methyl ethenyl benzene. Thus, polymerization can be effected under bulk conditions or in solution, suspension or emulsion techniques comparable to those used for styrene polymerization. The polymerization catalysts may be of the free radical, anionic or cationic types. Suitable free radical initiators include ditertiary butyl peroxide, azo-bis (isobutyronitrile), di-benzoyl peroxide, tertiary butyl perbenzoate, dicumyl peroxide and potassium persulfate. Cationic initiators are generally of the Lewis acid type, for example, aluminum trichloride, boron trifluoride, boron trifluoride etherate complexes, titanium tetrachloride and the like. Anionic initiators are generally of the formula $RM_y$ where R is organo, mono- or polyvalent and may be alkyl, alkenyl, aryl, aralkyl, and alkaryl, and can contain from 1 to about 50 carbon atoms; and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type may be used. Branched chain polymers may be obtained by using multifunctional initiators, for example, 1,3,5-trilithiocyclohexane and 1,4,7,10-tetrapotassiodecane. In the anionic polymerization each molecule of the initiator starts one anionic polymer chain; multiple anions can permit addition of secondary chains to the main chain. Stereospecific catalysts can also be used to advantage. Such catalysts are generally of the well known Ziegler type, comprising a transition metal of Group 4A, 5A, 6A or 7, a valence state lower than its maximum in combination with an organometallic compound of Group 2 or 3.

Among the reducible transitional metal compounds suitable for the purpose of this invention are the heavy metal, inorganic compounds such as halides, oxyhalides, complex halides, hydroxides, and organic compounds such as alcoholates, acetates, benzoates, and acetyl acetonates, of the requisite metals. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zirconium acetylacetonate.

The reduction can be effected in any suitable manner, for example, by reduction with hydrogen or aluminum. Titanium tetrachloride can be readily reduced to titanium trichloride by reduction with hydrogen, aluminum or titanium metal. Suitable reduction methods are well known in the art and are described, for example, in U.S. Pat. No. 3,362,940 which is incorporated herein by reference.

The other component of the catalyst system is at least one organometallic compound of a metal of Groups 2 or 3. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radical, alkoxy, amino, hydrogen etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromoaluminum hydride, dipropylaluminum hydride, propyl zinc hydride, ethylmagnesium hydride, and methoxyaluminum diethyl. Mixtures of two or more oganometallic compounds can be used.

The catalyst can be formed by methods well known in the art. Thus, for example, it can be made by charging the components separately to the polymerization zone or they can be combined immediately prior to entry into the zone.

As previously mentioned, the polymerization may be carried out in bulk, in solution, in suspension or in emulsion. Solution polymerization will generally employ inert hydrocarbon solvents such as toluene, benzene or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with the styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

Polymerization can also be carried out thermally.

The polymerization conditions will generally be similar to those used for styrene. Thus temperatures will generally be in the range of 0° to 200° C., preferably 50° to 150° C., with a range of about 80°" C. to +30° C. being most appropriate for cationic polymerization.

The methyl ethenyl benzene polymers which can contribute one component of the compositions of the invention are notable for a higher Vicat softening temperature than polystyrene. Vicat softening temperature is measured by ASTM method D-1525. It, also, has been found to vary with the content of p-isomer in the monomer mixture, as shown below in Table 1.

TABLE 1

| Content of 1-methyl-4-ethenyl benzene, wt. percent | Vicat °C. ± 1° C. |
| --- | --- |
| 99.7 | 118 |
| 97.0 | 119 |

TABLE 1-continued

| Content of 1-methyl-4-ethenyl benzene, wt. percent | Vicat °C. ± 1° C. |
|---|---|
| 95.5 | 114 |
| 89.3 | 108 |

By comparison, styrene has a Vicat of about 107° to 108° C. and the polymer of "vinyl toluene" a Vicat of only 97° C. Thus, the homopolymers prepared from the above described mixture are characterized by a Vicat temperature of at least 100° C., generally at least 110° C. or 112° C.

The polymers will generally have a molecular weight corresponding to intrinsic viscosities of 0.1 to 10 (toluene/30° C.). This will generally correspond to molecular weights of at least 30,000, with most molecular weights (Mv—viscosity average) being about 250,000 to 275,000 for commercial materials. The glass transition temperatures for very low molecular weight materials (below 50,000) may be lower than those indicated and therefore not suited for uses where solid state properties are desired. The melt indices will normally be in the range of 1.0 to 10.0, generally 4.0 to 7.0. Relative densities of the polymers are comparable to those of styrene, being just above 1.0, generally about 1.01. Good optical properties as indicated by transmittances of at least 88% are typical of the polymers. The pentane uptake is generally about 40%, as compared to about 1-2% for polystyrene, thereby indicating a greater affinity for hydrocarbons.

Another class of poly(methyl ethenyl benzene) resins particularly desirable for use in the present invention are the high impact copolymers produced by grafting units derived from the above described polymerizable mixture onto a backbone polymer which is generally of a rubbery nature. Suitable backbone polymers include polybutadiene, poly(dimethyl butadiene), polyisoprene, polychloroprene and other synthetic rubbers such as the styrene-butadiene rubbers (SBR), ethylene-propylene rubbers (EPR), etylene-propylene-diene elastomers, polyacrylates, nitrile rubbers and copolymers with other aromatic monomers including vinyl toluene. The backbone will generally comprise 2 to 25 percent by weight of the high impact copolymer, preferably 3 to 15% by weight, most preferably 5 to 10 percent by weight. Normal techniques, e.g., grafting, comparable to those used for making high impact polystyrenes are useful; they are well known in the art and referred to, for example, in U.S. Pat. No. 2,694,692 which is incorporated herein by reference, and in British Pat. No. 1,054,301.

Random copolymers formed with methyl ethyl benzene isomers and butadiene can also be used in the invention. They can be produced by methods similar to those used in the manufacture of GR-S synthetic rubber and described, for example, in "Synthetic Rubber", Ed. Whitby et al, John Wiley, New York, 1954. A suitable polymerization mixture is shown in Table 2 below:

TABLE 2

| Butadiene - MEB Polymerization Formula | |
|---|---|
| | Parts per 100 parts Total Monomers |
| Butadiene | 70 |
| Methyl-ethenyl benzene mixture | 30 |
| Dodecyl mercaptan | 0.5 |
| Potassium persulfate | 0.23 |
| Soap (anhydrous basis) | 4.3 |
| Water | 180 |
| | 285.03 |

Generally, a slightly greater proportion by weight will be required for the methyl ethenyl benzene mixture, as compared to styrene, because of its higher molecular weight. However, the polymerization conditions used for styrene will be generally applicable with the new monomer mixture.

Block copolymers comprising at least 50 weight percent of the mixture of methyl ethenyl benzene monomers described above can be prepared by methods well known in the art and can be used as a component of the composition of this invention.

The composition of the present invention can also contain various additives to impart desired characteristics. Typical of these additives are fire retardants such as brominated or chlorinated aromatic or aliphatic compounds or antimony oxide, reinforcing agents such as fiber glass and calcium oxide, and release agents and pigments.

The invention is illustrated by the following non-limiting examples.

The following Examples illustrate the compositions of the invention and compare them to compositions of the prior art:

EXAMPLE 1

Extrusion grade crystal polystyrene resin having a number average molecular weight (Mn) of 120,000, a weight average molecular weight (Mw) of 250,000 and a softening range of about 170°-190° C. was compounded and pelletized in a 1.5 inch Davis Standard extruder equipped with a single stage screw and pelletizing hopper. Screw speed was 50 rpm, head pressure was 1675 psi and temperature in the barrel of the extruder ranged from 195° to 205° C. while the temperature at the die was 205° to 215° C. The resulting pellets were determined to have a melt index of 2.6.

EXAMPLE 2

The procedure of Example 1 was repeated using 6810 grams of polystyrene resin as pellets which had been tumbled with 170 grams of mineral oil having a Saybolt viscosity at 37.5° C. of 360 and an open cup flash point of 102° C. to make a 2.5 weight percent loading of mineral oil. Compounding and pelletizing resulted in separation of mineral oil and resin at the die. The melt index of the resulting pellets was 3.1.

EXAMPLE 3

The procedure of Example 2 was followed but using 360 grams of mineral oil to make a 5 weight percent concentration. Compounding and pelletizing resulted in separation of oil and resin at the die. The resulting pellets had a 3.0 melt index. Resin and mineral oil separated at the die.

EXAMPLE 4

The procedure of Example 1 was repeated but replacing the polystyrene resin with extrusion grade poly(methyl ethenyl benzene) resin obtained by polymerizing a mixture of isomeric monomers comprising 0.05 weight percent 1-methyl-2-ethenyl benzene, 2.6 weight percent 1-methyl-3-ethenyl benzene and 97.4 weight percent 1-methyl-4-ethenyl benzene. After compounding and pelletizing the resin had a melt index of 2.9.

EXAMPLE 5

The procedure of Example 2 was followed but replacing polystyrene resin with the poly(methyl ethenyl benzene) resin of Example 4. The resulting resin after compounding and pelletizing had a 6.1 melt index. The extrudate at the die was compatible.

EXAMPLE 6

The procedure of Example 3 was followed by replacing the polystyrene resin with the poly(methyl ethenyl) styrene resin of Example 4. After compounding and pelletizing, the melt index was 9.6. The extrudate at the die was compatible.

It will be appreciated that, while crystalline polystyrene and the poly(methyl ethenyl benzene) resin of this invention when identically compounded and pelletized have roughly the same melt indices, addition of mineral oil to the poly(methyl ethenyl benzene) resin results in homogenous composition having significantly increased melt index, while the styrene resin and mineral oil separated with little change in melt index.

What is claimed is:

1. A polymeric composition comprising a compatible mixture of a preformed polymer or a copolymer containing, in polymerized form, at least 50 weight percent of a monomer mixture comprising 0 to 0.1 percent by weight 1-methyl-2-ethenyl benzene, 0 to 15 percent by weight 1-methyl-3-ethenyl benzene and at least 85 percent by weight 1-methyl-4-ethenyl benzene; and 50–0 percent of a different ethylenically unsaturated monomer; and 1 to 10 percent by weight of the composition of mineral oil.

2. The composition of claim 1 wherein said monomer mixture comprises at least 90 percent by weight 1-methyl-4-ethenyl benzene, 1 to 10 percent by weight 1-methyl-3-ethenyl benzene and 0 to 0.1 percent by weight 1-methyl-2-ethenyl benzene.

3. The composition of claim 1 wherein said monomer mixture comprises at least 95 percent by weight 1-methyl-4-ethenyl benzene, 1 to 5 percent by weight 1-methyl-3-ethenyl benzene and 0 to 0.05 percent by weight 1-methyl-2-ethenyl benzene.

4. Th composition of claim 1 wherein said monomer mixture comprises at least 97 percent by weight 1-methyl-4-ethenyl benzene and 1 to 3 percent by weight 1-methyl-3-ethenyl benzene.

5. The composition of claim 1 wherein said mineral oil has a Saybolt Viscosity of about 50 to 500 SUS at 37.5° C.

6. The composition of claim 5 wherein said mineral oil has a Saybolt Viscosity of about 200 to 400 SUS at 37.5° C.

7. The polymeric composition of claim 1 in which said polymer or copolymer is a high impact copolymer produced by grafting to a rubbery backbone polymer.

* * * * *